United States Patent
Hajarian et al.

(10) Patent No.: US 12,411,986 B2
(45) Date of Patent: Sep. 9, 2025

(54) DATA TREATMENT APPARATUS AND METHODS

(71) Applicant: The Toronto-Dominion Bank, Toronto (CA)

(72) Inventors: Elham Hajarian, Toronto (CA); Méliné Nikoghossian, Toronto (CA); Gabriel Ramon Lorenzana, Toronto (CA); Suhailah Syeda Rahman, Mississauga (CA); Nithin Balaji Venkatnarayanan, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 516 days.

(21) Appl. No.: 17/723,957

(22) Filed: Apr. 19, 2022

(65) Prior Publication Data

US 2023/0334176 A1 Oct. 19, 2023

(51) Int. Cl.
*G06F 21/00* (2013.01)
*G06F 21/62* (2013.01)

(52) U.S. Cl.
CPC .............................. *G06F 21/6254* (2013.01)

(58) Field of Classification Search
CPC .................... G06F 21/6254; G06F 21/6227
See application file for complete search history.

(56) References Cited

U.S. PATENT DOCUMENTS

| | | | |
|---|---|---|---|
| 9,792,454 B2 | 10/2017 | Rozenberg et al. | |
| 10,114,955 B2 | 10/2018 | Conway | |
| 11,062,043 B2 | 7/2021 | Binkley et al. | |
| 11,200,338 B2 | 12/2021 | Hoa | |
| 11,227,068 B2 | 1/2022 | Parthasarathy | |
| 2013/0103685 A1 | 4/2013 | Preneel et al. | |
| 2015/0096040 A1* | 4/2015 | Mattsson | G06F 21/64 726/26 |
| 2016/0210470 A1* | 7/2016 | Rozenberg | G06F 21/6227 |
| 2017/0078144 A1* | 3/2017 | Purusothaman | H04L 41/0813 |
| 2020/0293681 A1* | 9/2020 | Hoa | G06F 21/554 |
| 2020/0304295 A1* | 9/2020 | Paudyal | G06F 21/602 |
| 2020/0327252 A1 | 10/2020 | Du Preez al. | |
| 2021/0004373 A1 | 1/2021 | Sankaran et al. | |
| 2021/0133557 A1* | 5/2021 | Iyoob | G06F 40/205 |
| 2021/0312077 A1* | 10/2021 | Jain | G06F 21/46 |
| 2022/0067205 A1* | 3/2022 | Lindsay | G06F 40/166 |

* cited by examiner

*Primary Examiner* — Michael M Lee
(74) *Attorney, Agent, or Firm* — Marks & Clerk; Paul Horbal

(57) ABSTRACT

Apparatus and methods for streamlining a de-risking data security workflow. Data security requests identify information requested to be exported from a sensitive database. A de-risking database is searched to identify prior data requests for related information and, when found, the data request may be automatically approved subject to any specified data treatments. When prior data requests are not found, the data request may be assessed further and, if approved, the de-risking database may be populated accordingly, along with an indication of data treatments to be applied.

18 Claims, 4 Drawing Sheets

DATA TREATMENT APPARATUS AND METHODS

TECHNICAL FIELD

The disclosed exemplary embodiments relate to computer-implemented systems and methods for processing confidential data.

BACKGROUND

Within a computing environment, there may exist databases or data stores that contain sensitive information (e.g., personally identifiable information or "PII") that is required to be kept confidential. Often, it is not the entire record that is sensitive, but merely an element of the record. For example, an identifier number may be considered sensitive, while an identifier type may not.

In many cases, it may be desirable to use the data in the data store, or portions thereof, for additional purposes, or to reveal portions of the data to certain individuals or entities. For instance, the data may be used to train or test machine learning models. In such cases, to protect any sensitive information in the data, obfuscation or tokenization can be employed to conceal or remove the sensitive information, such that it cannot be identified in the data to be used. Tokenization involves substituting a sensitive data element with a non-sensitive equivalent, i.e., a token.

Even seemingly innocuous information can be used to glean PII. For example, when considered alone, data such as postal codes, dates of birth or gender are not sufficient to identify an individual. However, when combined, these data can be used to identify individuals with a high degree of confidence. Therefore, time-consuming, and labor-intensive consideration and analysis is often called for when deciding as to what data may be released in an unobfuscated form, to avoid inadvertent release of PII. This difficulty is only further exacerbated when there is a diverse set of data that may be accessed by multiple users with varying access levels.

SUMMARY

The following summary is intended to introduce the reader to various aspects of the detailed description, but not to define or delimit any invention.

In at least one broad aspect, there is provided an apparatus for streamlining a data security workflow, the apparatus comprising: a communications interface; a memory storing instructions; and a processor coupled to the communications interface and the memory, the processor being configured to execute the instructions to: obtain, using the processor, a data request for data to be exported from a primary database, the data request comprising an identification of a column to be exported that includes elements of confidential data; search a de-risking database for a prior data request associated with the column to be exported; when the prior data request is not found: based on the data request, populate the de-risking database with the identification of the column for subsequent retrieval by one or more security users; update the de-risking database to indicate an approval of the data request and a data treatment to be applied to the column; when the prior data request is found, identify a prior data treatment corresponding to the prior data request for use as the data treatment; apply the data treatment to the column to generate a treated column; and provide output data responsive to the data request, the output data comprising the treated column in place of the column.

In some cases, when the prior data request is found, the data treatment is automatically approved.

In some cases, the data treatment is tokenization that tokenizes the elements of confidential data maintained within the column by replacing each of the elements of confidential data with a corresponding token maintained within a mapping table, and wherein the processor is further configured to execute the instructions to update the de-risking database by updating a tokenization rule applicable to the column.

In some cases, the request identifies a plurality of columns to be exported, and wherein the data treatment specifies tokenization rules for each of the plurality of columns.

In some cases, the plurality of columns are from a plurality of tables, and wherein the processor is further configured to execute the instructions to validate the tokenization rules for the plurality of columns to ensure that a column join operation can be performed.

In some cases, the processor is further configured to execute the instructions to perform the column join operation following application of the prior data treatment.

In some cases, the de-risking database comprises a de-risking table, wherein the identification of the column comprises a row in the de-risking table, and wherein the data treatment applicable to the row is identified in a data treatment column of the de-risking table.

In some cases, the de-risking table comprises a security classification column.

In some cases, the de-risking table comprises one or more metadata columns.

In some cases, the de-risking table comprises a join identifier column that identifies a column to be used for join operations.

In at least another broad aspect, there is provided a method of streamlining a data security workflow, the method comprising: obtaining, using a processor, a data request for data to be exported from a primary database, the data request comprising an identification of a column to be exported that includes elements of confidential data; searching a de-risking database for a prior data request associated with the column to be exported; when the prior data request is not found: based on the data request, populating, using the processor, the de-risking database with the identification of the column for subsequent retrieval by one or more security users; updating, using the processor, the de-risking database to indicate an approval of the data request and a data treatment to be applied to the column; when the prior data request is found, identifying a prior data treatment corresponding to the prior data request for use as the data treatment; applying, using the processor, the data treatment to the column to generate a treated column; and providing, using the processor, output data responsive to the data request, the output data comprising the treated column in place of the column.

In some cases, when the prior data request is found, the data treatment is automatically approved.

In some cases, the data treatment is tokenization that tokenizes the elements of confidential data maintained within the column by replacing each of the elements of confidential data with a corresponding token maintained within a mapping table, and wherein the updating the de-risking database further comprises updating a tokenization rule applicable to the column.

In some cases, the request identifies a plurality of columns to be exported, and wherein the data treatment specifies tokenization rules for each of the plurality of columns.

In some cases, the plurality of columns are from a plurality of tables, the method further comprising validating the tokenization rules for the plurality of columns to ensure that a column join operation can be performed.

In some cases, the method further comprises performing the column join operation following application of the prior data treatment.

In some cases, the de-risking database comprises a de-risking table, wherein the identification of the column comprises a row in the de-risking table, and wherein the data treatment applicable to the row is identified in a data treatment column of the de-risking table.

In some cases, the de-risking table comprises a security classification column.

In some cases, the de-risking table comprises one or more metadata columns.

In some cases, the de-risking table comprises a join identifier column that identifies a column to be used for join operations.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
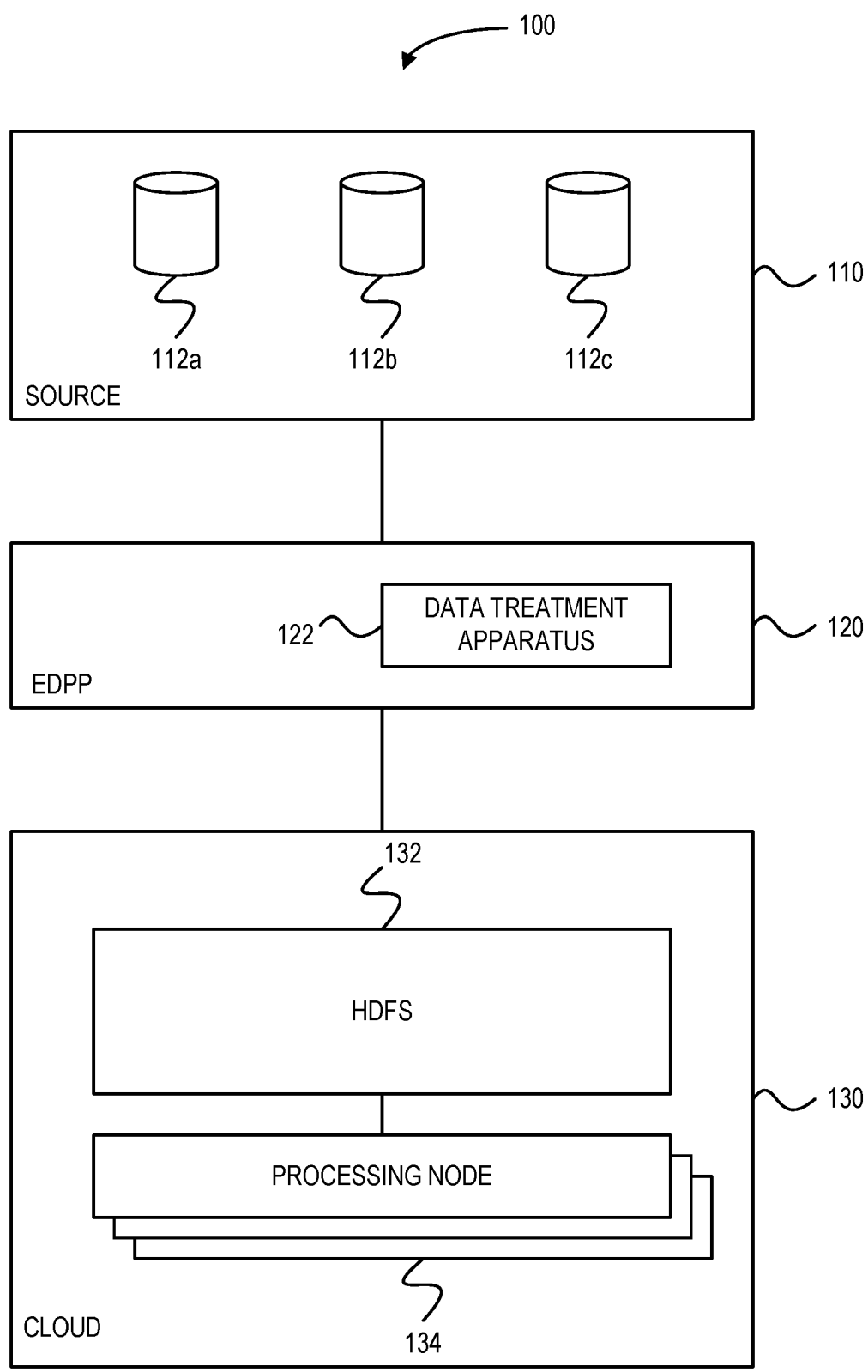
FIG. 1 is a block diagram illustrating an example computing system.

Many organizations have and maintain confidential data regarding their operations. For instance, some organizations may have confidential data concerning industrial formulas and processes. Other organizations may have confidential data concerning customers and their interactions with those customers. In a large organization, this confidential data may be stored in a variety of databases, which may have different, sometimes incompatible schemas, fields and compositions. A sufficiently large organization may have hundreds of millions of records across these various databases, corresponding to tens of thousands, hundreds of thousands or even millions of customers. This quantity and scope of confidential data represents a highly desirable source of data to be used as input into machine learning models that can be trained, e.g., to predict future occurrences of events, such as customer interactions or non-interactions.

With such large volumes of data, it may be desirable to use the computational resources available in distributed or cloud-based computing systems. For instance, many distributed or cloud-based computing clusters provide parallelized, fault-tolerant distributed computing and analytical protocols (e.g., the Apache Spark™ distributed, cluster-computing framework, the Databricks™ analytical platform, etc.) that facilitate adaptive training of machine learning or artificial intelligence processes, and real-time application the adaptively trained machine learning processes or artificial intelligence processes to input datasets or input feature vectors. These processes can involve large numbers of massively parallelizable vector-matrix operations, and the distributed or cloud-based computing clusters often include graphics processing units (GPUs) capable of processing thousands of operations (e.g., vector operations) in a single clock cycle and/or tensor processing units (TPUs) capable of processing hundreds of thousands of operations (e.g., matrix operations) in a single clock cycle. Use of such distributed or cloud-based computing clusters can therefore accelerate the training and subsequent deployment of the machine-learning and artificial-intelligence processes, and may result in a higher throughput during training and subsequent deployment, when compared to the training and subsequent deployment of the machine-learning and artificial-intelligence processes across the existing computing systems of a particular organization.

However, in many cases, there may be confidentiality and privacy restrictions imposed on organizations by governmental, regulatory, or other entities. These privacy restrictions may prohibit the confidential data from being transmitted to computing systems that are not within the exclusive control of an organization, for example, or that are shared among multiple organizations, as is common in a cloud-based environment. Such privacy restrictions may prohibit the confidential data from being transmitted to distributed or cloud-based computing systems without appropriate anonymization or obfuscation of PII in the confidential data.

To comply with such restrictions, the computing systems of an organization may "de-risk" data tables that contain confidential data prior to transmission to such distributed or cloud-based computing systems. This de-risking process may, for example, obfuscate or mask elements of confidential data, or may exclude certain elements, depending on the specific restrictions applicable to the confidential data. The specific type of obfuscation, masking or other processing is referred to as a "data treatment."

Data treatments may include, e.g., anonymizing, masking, deleting, encrypting, hashing, or tokenizing sensitive data elements. For example, a data treatment may specify that all elements in a particular column of a table should be tokenized in a particular way, and may also specify where mapping information is to be stored for de-tokenization purposes, if necessary. Some data treatments may attempt to preserve a structure or format of the underlying data (e.g., a credit card number may be tokenized in such a fashion that the tokenized card number still observes credit card number validation rules). Nevertheless, data treatment can create challenges for further data processing in database environments. Tokenization, encryption, hashing and other masking techniques may disrupt or destroy the referential integrity between columns in discrete data tables. Without this referential integrity, it may become difficult or impossible to perform desirable operations such as join operations that combine data from different tables.

Furthermore, and regardless of the specific data treatment used, the risk of data treatment reversal may remain. This risk is amplified when related data is de-risked in diverse ways, whether because the related data is drawn from different databases that employ different data treatments, or because the related data is obtained at various times using different data treatments. Moreover, even seemingly innocuous data such as postal codes, dates of birth or gender can be combined to identify individuals with a high degree of confidence. As a result, each time a new data treatment is proposed for a given set of data, it can be important to consider existing data treatments for that set of data, and the effect the new data treatment could have on the proposed new data treatment. The review can be time-consuming and labor-intensive, and may be further exacerbated when there is a diverse set of data under consideration by multiple stakeholders.

The apparatus and methods described herein generally provide for streamlining the data treatment process used to identify sensitive information and the rules to be applied to protect such sensitive information when data is exported from a secure database for particular applications. The described methods serve to reduce the number of iterations required between various stakeholders and may, in some cases, automate certain portions of the data treatment process. The described embodiments obtain information about the data requested to be exported, its characteristics, and the data treatment rules to be applied. In particular, the described embodiments operate to obtain the information and organize it in a uniform way, and may provide a central repository as the data requested to be exported is assessed and/or approved, along with the applicable data treatment rules. In some known instances, the described embodiments have served to streamline the data treatment process from more than 14 cycles between requesters and risk assessors, down to as few as 2. In particular, the described embodiments allow for approval of previously-reviewed tables and columns to be expedited or even automatically approved.

Referring now to FIG. 1, there is illustrated a block diagram of an example computing system, in accordance with at least some embodiments. Computing system 100 has a secure database system 110, an enterprise data provisioning platform (EDPP) 120 operatively coupled to the secure database system 110, and a cloud-based computing cluster 130 that is operatively coupled to the EDPP 120.

Secure database system 110 has one or more databases, of which three are shown for illustrative purposes: database 112a, database 112b and database 112c. Each of the databases of secure database system 110 may contain confidential information that is subject to restrictions on export.

EDPP 120 may periodically receive source data exported from secure database system 110 and perform extract, transform and load (ETL) operations on the received source data. ETL operations are performed according to any data treatments that apply to the received source data to generate treated data and, accordingly, may include any de-risking operations that may be applicable to the source data such as tokenization. The treated data is then transmitted to the cloud-based computing cluster 130 where it may be stored, e.g., in a distributed file system 132 such as the Hadoop Distributed File System. Within the distributed file system, data may be imported into one or more tables. Some tables may contain input data for machine learning models, whereas others may contain output inference data from the machine learning models. Still other tables may be used for other purposes, such as data from downstream client applications.

Within the cloud-based computing cluster 130, one or more processing nodes 134 may be configured to implement and execute machine learning models that operate on input data retrieved from the distributed file system 132 to train the machine learning models, generate output inference data from input data, and store the output inference data in distributed file system 132.

EDPP 120 may incorporate a data treatment apparatus 122 or, alternatively, a discrete data treatment apparatus may be operatively coupled to EDPP 120, to secure database system 110, and/or cloud-based computing cluster 130. The operation of data treatment apparatus 122 is described further herein, with reference to FIG. 3.

Figure 2:
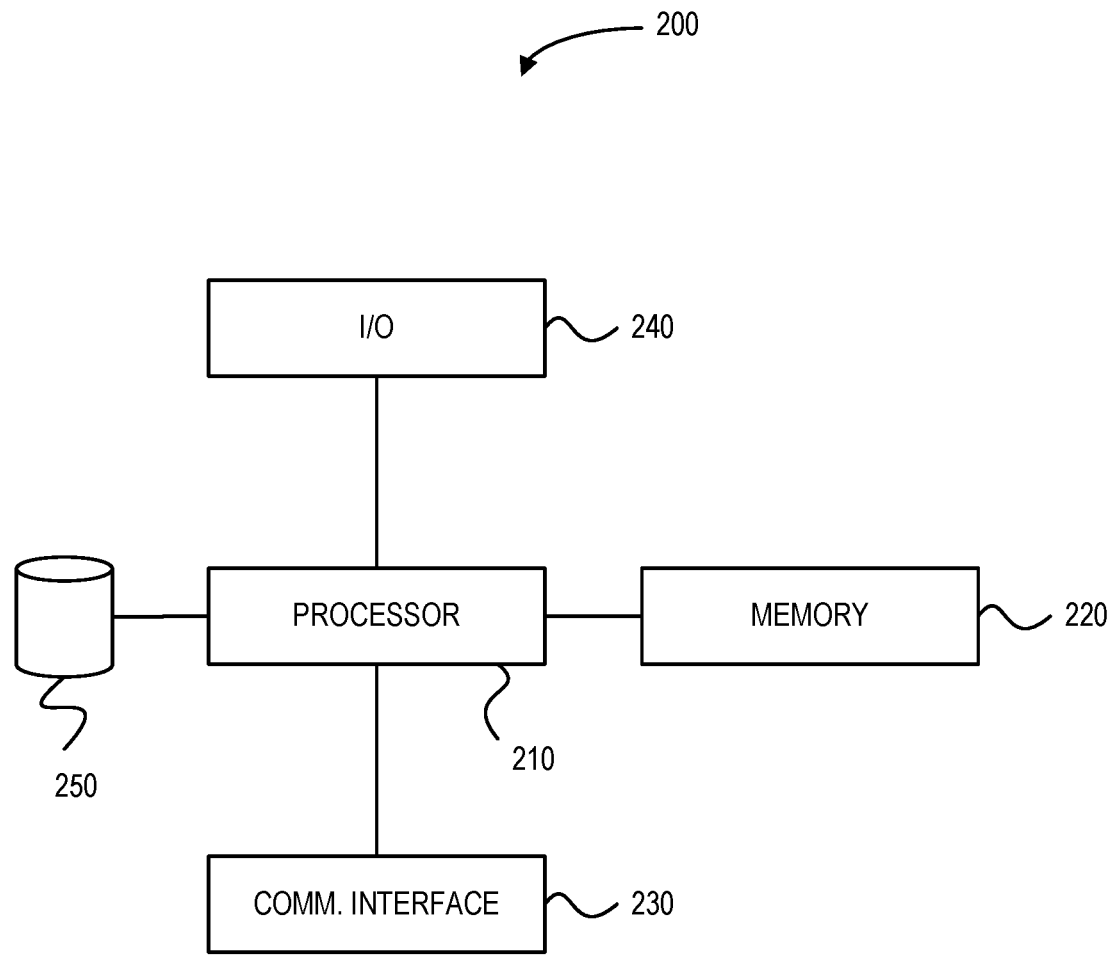
FIG. 2 is a block diagram illustrating a data treatment apparatus in accordance with at least some embodiments.

Referring now to FIG. 2, there is illustrated a simplified block diagram of a data treatment apparatus in accordance with at least some embodiments. Data treatment apparatus 200 is an example implementation of data treatment apparatus 122 of FIG. 1, and has at least one processor 210 operatively coupled to at least one memory 220, at least one communications interface 230, at least one input/output device 240, and a de-risking database 250.

The at least one memory 220 includes a volatile memory that stores instructions executed or executable by processor 210, and input and output data used or generated during execution of the instructions. Memory 220 may also include non-volatile memory used to store input and/or output data along with program code containing executable instructions.

Processor 210 may transmit or receive data via communications interface 230, and may also transmit or receive data via any other input/output device 240 as appropriate.

De-risking database 250 may be an external database to which processor 210 is operatively coupled via communications interface 230. Alternatively, de-risking database 250 may be stored locally in memory 220.

Figure 3:
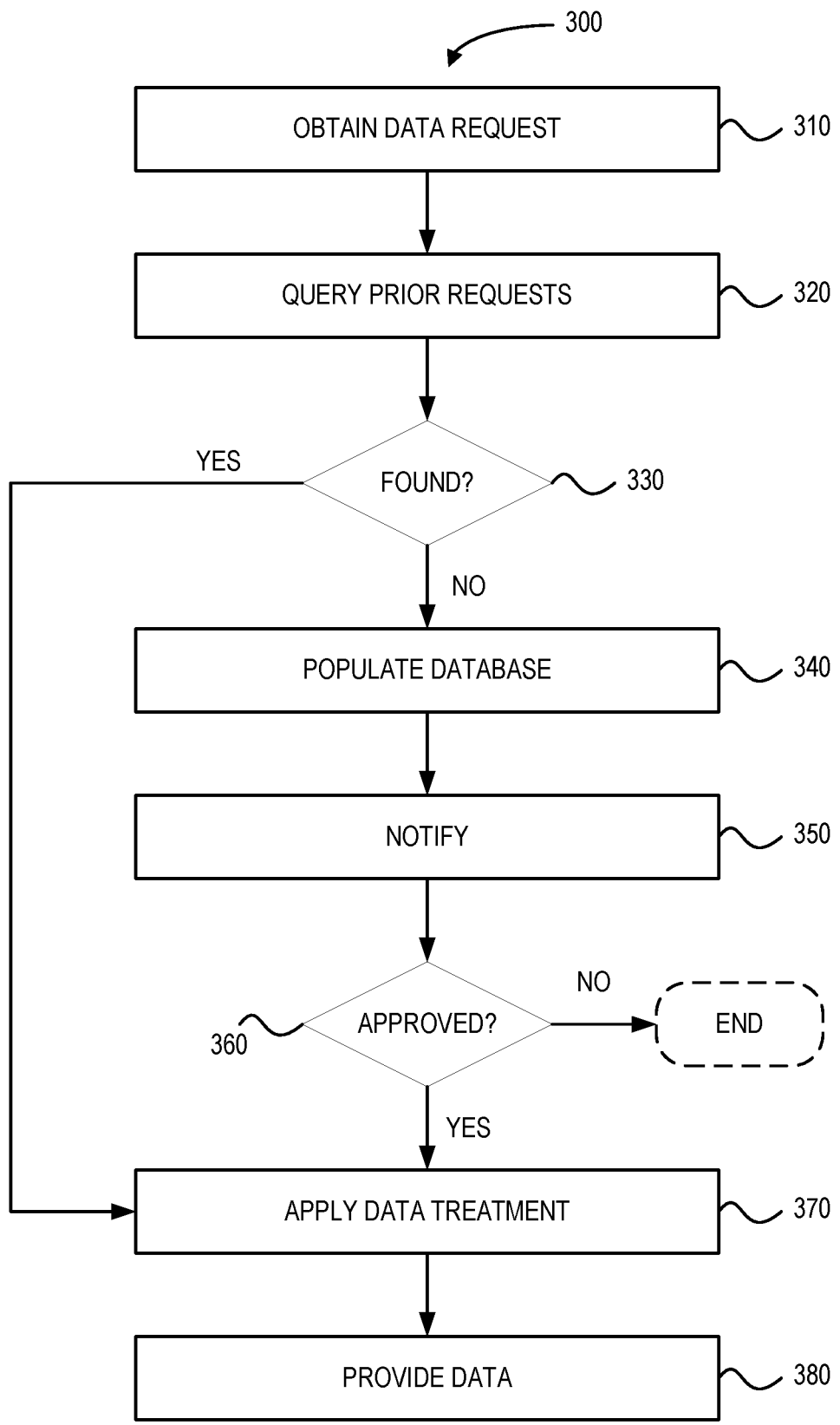
FIG. 3 is a flowchart diagram of an example method of streamlining a data security workflow in accordance with at least some embodiments.

Referring now to FIG. 3, there is illustrated a flowchart diagram of an example method of streamlining a data security workflow in accordance with at least some embodiments. Method 300 may be carried out, e.g., by a processor of a data treatment apparatus such as data treatment apparatus 200 or 122.

Method 300 begins at 310, with the processor obtaining a data request for data to be exported from a primary database, such as a database 112 of secure database system 110, for example. Alternatively, the primary database can be any database containing data that is subject to de-risking.

The data request may originate from a client computer that wishes to retrieve data from the primary database. The data request generally will comprise an identification of the specific table or tables from which the data is to be retrieved, and the specific columns that should be included in the retrieved data and that include or may include elements of confidential data. Optionally, in some cases, the data request may specify records or keys corresponding to the data to be retrieved. In embodiments with multiple databases, the data request may also identify additional databases from which the data is to be retrieved.

Figure 4:
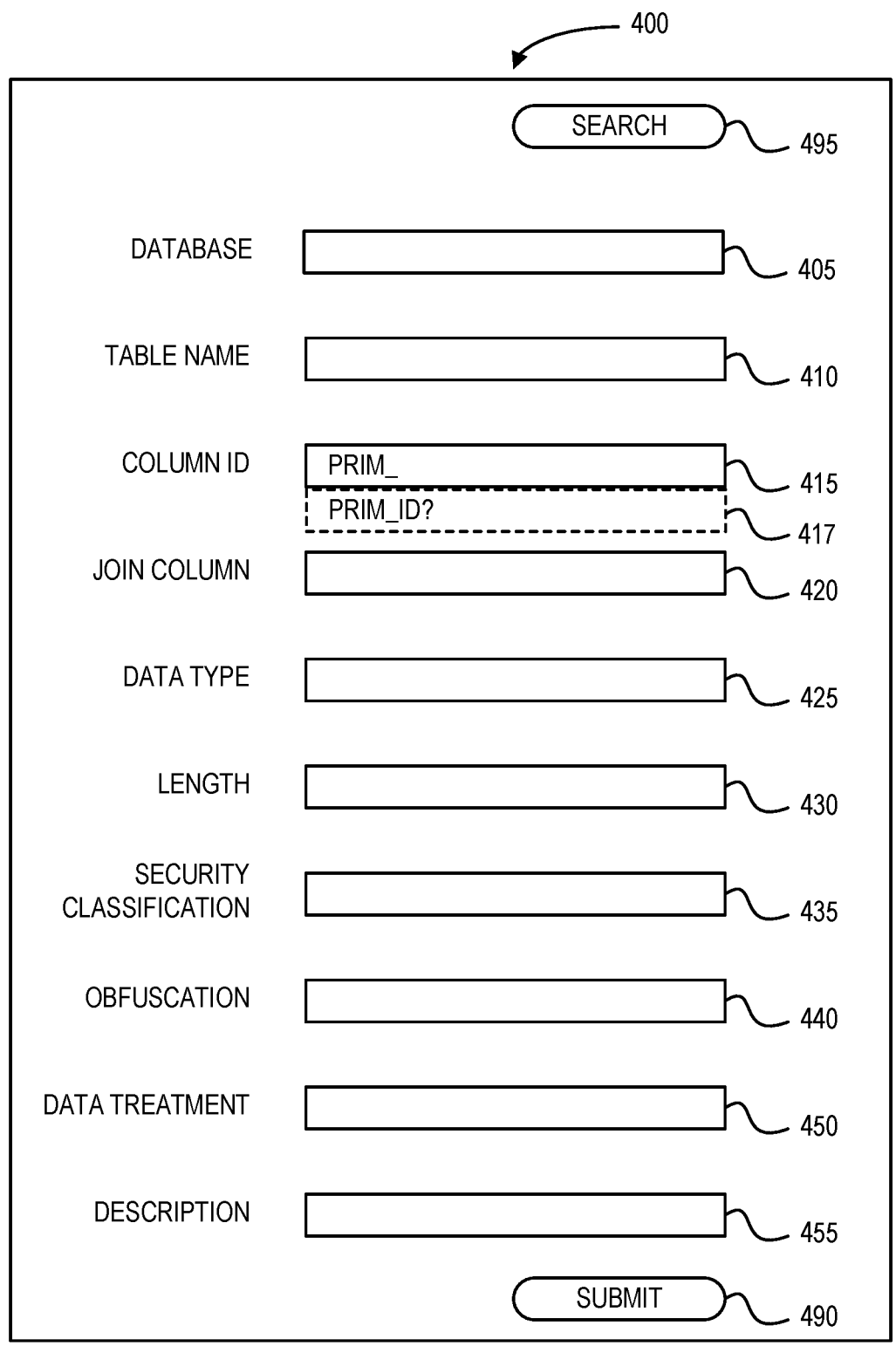
FIG. 4 is a schematic drawing of a graphical user interface in accordance with at least some embodiments.

In some embodiments, a graphical user interface tool may be provided to facilitate search and input of the data request at the client computer. An example graphical user interface, in accordance with at least some embodiments, is shown in FIG. 4. The graphical user interface tool 400 may be a form, provided through an end-user software application or web page, which facilitates consistent and systematic entry of the data request fields. In some cases, the form may be presented in a wizard-style interface. Graphical user interface tool 400 provides text input fields such as database input field 405, table name input field 410, column identifier input field 415, join column input field 420, data type input field 425, length input field 430, security classification input field 435, obfuscation input field 440, data treatment input field 450, and description input field 455. In some cases, the graphical user interface tool may also provide search and/or auto-completion functionality to facilitate efficient entry, as shown in the temporary field 417. If the user accepts the suggestion, for instance by selecting the temporary field 417, then the other fields may be automatically filled—or suggested to be automatically filled—using data from the corresponding record. For example, if a "PRIM_ID" column has been previously requested, the partial or full input of "PRIM_ID" in the column field or a search field may cause the processor to identify existing instances of "PRIM_ID" in the de-risking database, and automatically populate the remaining fields of the form using metadata drawn from the relevant entry in the de-risking database. Alternatively, the user may manually search for existing instances by entering partial input and selecting the search button 495. When the user is satisfied with the input data, they may submit the input for inclusion in the de-risking database by selecting the submit button 490.

Referring again to FIG. 3, once the data request is received by the data treatment apparatus, then at 320 the processor queries a de-risking database, such as de-risking database 250, for a prior data request associated with the column or columns to be exported pursuant to the current data request and, if such a prior data request exists, a prior data treatment corresponding to the prior data request. In some embodiments, the processor may query directly for the column or columns to be exported. For example, if the current data request identifies a column named "ID" in a database named "USERS," then the processor searches within the de-risking database for prior data requests for the "ID" column from the "USERS" database.

At 330, the processor determines if any entries matching the query have been located and, if yes, proceeds to 370. Such data requests may be automatically approved with the data treatment previously approved for such columns to be exported. Otherwise, the processor proceeds to 340.

At 340, the processor populates a new entry in the de-risking database, with information drawn from the data request, such as identification of the column or columns to be exported and the respective table and database names. Additional metadata information can also be populated, such as whether the column is a join column, data types of the column, data size, security classification (if known), whether obfuscation is desired, a requested data treatment, a human readable description, and an indication of whether the data treatment applicable to the column is approved. Table 1 provides an example of one de-risking database table, where columns to be exported are shown in rows and the columns of the table identify corresponding identifiers, join columns, data type, length, security classification, obfuscation, data treatment and a brief description.

At 350, a notification is generated indicating that a new entry has been added to the de-risking database, and that a risk assessment relating to the data request should be completed. In at least some cases, the notification is transmitted to a computing device of a risk assessment user. The risk assessment is carried out by considering the data to be exported and considering prior data requests, approved or otherwise, which will also be identified in the de-risking database.

In some cases, a data request may identify columns from multiple tables along with join columns. In such cases, tokenization rules may be validated to ensure that the join operations can be performed successfully following application of tokenization.

When the risk assessment determines that the data request is approved at 360, the corresponding entry in the de-risking database can be updated to indicate the approval and the specific data treatment applicable to the column or columns to be exported. The de-risking database may also be updated to add metadata that was not populated from the data request, or to revise it. Metadata that is added or updated may include, e.g., database identifiers, table names, column names, whether columns are to be used for joining, data types, length, security classification (e.g., internal, restricted, confidential, etc.), descriptions and data treatment. The de-risking database may be stored and made accessible to other risk assessment users and end users. The de-risking database may be, in some cases, a spreadsheet document.

In at least some embodiments, snapshots of the de-risking database may be taken, to enable later reference to earlier versions of the de-risking database, and to allow for reversal of prior approvals where necessary or desired.

Otherwise, if the data request is not approved at 360, no further action need be taken, however in some cases the de-risking database may be updated to indicate the non-approval, to delete the entries corresponding the non-approved data request, or both, depending on the circumstances.

Depending on the specific data treatment, other database tables or configuration files may be modified to reflect the data treatment. For instance, if a tokenization data treatment is selected to tokenize elements of confidential data, then a corresponding mapping table may be provisioned or identified to map the elements to their corresponding tokens, and/or a configuration file may be generated to identify the form of the tokenization to be applied. Information regarding the tokenization or other data treatments may also be stored or updated in the de-risking database in association with the columns to be exported. Similarly, if a plurality of

TABLE 1

Example de-risking database table

| ID | JOIN COLUMN | DATA TYPE | LENGTH | SECURITY CLASSIFICATION | OBFUSCATION | DATA TREATMENT | DESCRIPTION |
| --- | --- | --- | --- | --- | --- | --- | --- |
| PRIM_ID | PRIM_ID | bigint | 19 | Internal | No | Tokenize | Unique primary key |
| TABLE_ID | TABLE:PRIM_ID | bigint | 19 | Internal | No | Tokenize | Reference to user ID |
| BIG_FIELD1 | | string | −1 | Restricted | No | Tokenize | Name |
| BIG_FIELD2 | | string | −1 | Restricted | No | Tokenize | Address |
| FIELD1 | | bigint | −1 | Internal | No | Tokenize | Balance |
| FIELD2 | | bigint | −1 | Confidential | No | Tokenize | Transaction count |
| FIELD3 | | bigint | −1 | Restricted | No | Tokenize | Days since last attestation | columns are to be exported, then each column may have different tokenization rules applicable to them specified as part of the data treatment.

At 370, the columns to be exported may be retrieved and the data treatment corresponding to the columns to be exported may be identified and applied to generate one or more treated columns of data. The retrieval of the data and application of the data treatment, along with any join operations, may be performed by the processor of the data treatment apparatus, or it may be performed by other processors, such as by a processor of an EDPP.

At 380, the treated data may be provided, e.g., to the client computer from which the data request originated, to a cloud computing node, or to another device that has suitable access permissions to the data. Provision of the treated data may be performed by the processor of the data treatment apparatus, or it may be performed by other processors, such as by a processor of an EDPP.

Various apparatuses or processes have been described to provide examples of embodiments of the claimed subject matter. No such example embodiment described limits any claim and any claim may cover processes or apparatuses that differ from those described. The claims are not limited to apparatuses or processes having all the features of any one apparatus or process described above or to features common to multiple or all the apparatuses or processes described above. It is possible that an apparatus or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112*a*, or 1121). All elements with a common base number may be referred to collectively or generically using the base number without a suffix (e.g. 112).

The systems, methods, and apparatus described herein may be implemented as a combination of hardware or software. In some cases, the systems, methods, and apparatus described herein may be implemented, at least in part, by using one or more computer programs, executing on one or more programmable devices including at least one processing element, and a data storage element (including volatile and non-volatile memory and/or storage elements). These apparatus may also have at least one input device (e.g. a pushbutton keyboard, mouse, a touchscreen, and the like), and at least one output device (e.g. a display screen, a printer, a wireless radio, and the like) depending on the nature of the device. Further, in some examples, one or more of the systems, methods and apparatus described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems, apparatus and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer usable instructions may also be in various formats, including compiled and non-compiled code.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. An apparatus for streamlining a data security workflow, the apparatus comprising:
   a communications interface;
   a memory storing instructions; and
   a processor coupled to the communications interface and the memory, the processor being configured to execute the instructions to:
   obtain, using the processor, a data request for data to be exported from a primary database, the data request comprising an identification of a column to be exported that includes elements of confidential data;
   search a de-risking database for a prior data request associated with the column to be exported;
   in response to the search,
      when the prior data request is not found:
         based on the data request, populate the de-risking database with the identification of the column for subsequent retrieval by one or more security users;
         update the de-risking database to indicate an approval of the data request and a data treatment to be applied to the column, and to update a tokenization rule applicable to the column, wherein the data treatment is tokenization that tokenizes the elements of confidential data maintained within the column by replacing each of the elements of confidential data with a corresponding token maintained within a mapping table;
      when the prior data request is found, identify a prior data treatment corresponding to the prior data request for use as the data treatment;
   apply the data treatment to the column to generate a treated column; and
   provide output data responsive to the data request, the output data comprising the treated column in place of the column.

2. The apparatus of claim 1, when the prior data request is found, the data treatment is automatically approved.

3. The apparatus of claim 1, wherein the data request identifies a plurality of columns to be exported, and wherein the data treatment specifies tokenization rules for each of the plurality of columns.

4. The apparatus of claim 3, wherein the plurality of columns are from a plurality of tables, and wherein the processor is further configured to execute the instructions to validate the tokenization rules for the plurality of columns to ensure that a column join operation can be performed.

5. The apparatus of claim 4, wherein the processor is further configured to execute the instructions to perform the column join operation following application of the prior data treatment.

6. The apparatus of claim 1, wherein the de-risking database comprises a de-risking table, wherein the identification of the column comprises a row in the de-risking table, and wherein the data treatment applicable to the row is identified in a data treatment column of the de-risking table.

7. The apparatus of claim 6, wherein the de-risking table comprises a security classification column.

8. The apparatus of claim 6, wherein the de-risking table comprises one or more metadata columns.

9. The apparatus of claim 6, wherein the de-risking table comprises a join identifier column that identifies a column to be used for join operations.

10. A method of streamlining a data security workflow, the method comprising:
    obtaining, using a processor, a data request for data to be exported from a primary database, the data request comprising an identification of a column to be exported that includes elements of confidential data;
    searching a de-risking database for a prior data request associated with the column to be exported;
    in response to the searching,
       when the prior data request is not found:
          based on the data request, populating, using the processor, the de-risking database with the identification of the column for subsequent retrieval by one or more security users;
          updating, using the processor, the de-risking database to indicate an approval of the data request and a data treatment to be applied to the column, and to update a tokenization rule applicable to the column, wherein the data treatment is tokenization that tokenizes the elements of confidential data maintained within the column by replacing each of the elements of confidential data with a corresponding token maintained within a mapping table;
       when the prior data request is found, identifying a prior data treatment corresponding to the prior data request for use as the data treatment;

applying, using the processor, the data treatment to the column to generate a treated column; and providing, using the processor, output data responsive to the data request, the output data comprising the treated column in place of the column.

11. The method of claim 10, wherein when the prior data request is found, the data treatment is automatically approved.

12. The method of claim 10, wherein the data request identifies a plurality of columns to be exported, and wherein the data treatment specifies tokenization rules for each of the plurality of columns.

13. The method of claim 12, wherein the plurality of columns are from a plurality of tables, the method further comprising validating the tokenization rules for the plurality of columns to ensure that a column join operation can be performed.

14. The method of claim 13, further comprising performing the column join operation following application of the prior data treatment.

15. The method of claim 10, wherein the de-risking database comprises a de-risking table, wherein the identification of the column comprises a row in the de-risking table, and wherein the data treatment applicable to the row is identified in a data treatment column of the de-risking table.

16. The method of claim 15, wherein the de-risking table comprises a security classification column.

17. The method of claim 15, wherein the de-risking table comprises a join identifier column that identifies a column to be used for join operations.

18. A non-transitory computer readable medium storing computer executable instructions which, when executed by a computer processor, cause the computer processor to carry out a method of streamlining a data security workflow, the method comprising:

obtaining, using the processor, a data request for data to be exported from a primary database, the data request comprising an identification of a column to be exported that includes elements of confidential data;

searching a de-risking database for a prior data request associated with the column to be exported;

in response to the searching,
when the prior data request is not found:
based on the data request, populating, using the processor, the de-risking database with the identification of the column for subsequent retrieval by one or more security users;
updating, using the processor, the de-risking database to indicate an approval of the data request and a data treatment to be applied to the column, and to update a tokenization rule applicable to the column, wherein the data treatment is tokenization that tokenizes the elements of confidential data maintained within the column by replacing each of the elements of confidential data with a corresponding token maintained within a mapping table;
when the prior data request is found, identifying a prior data treatment for use as the data treatment;

applying, using the processor, the data treatment to the column to generate a treated column; and providing, using the processor, output data responsive to the data request, the output data comprising the treated column in place of the column.

* * * * *